US010929618B2

(12) United States Patent
Ishikawa et al.

(10) Patent No.: US 10,929,618 B2
(45) Date of Patent: Feb. 23, 2021

(54) TRANSLATION DEVICE AND TRANSLATION METHOD

(71) Applicant: Panasonic Intellectual Property Management Co., Ltd., Osaka (JP)

(72) Inventors: Tomokazu Ishikawa, Osaka (JP); Shoichi Araki, Osaka (JP)

(73) Assignee: PANASONIC INTELLECTUAL, PROPERTY MANAGEMENT CO., LTD., Osaka (JP)

( * ) Notice: Subject to any disclaimer, the term of this patent is extended or adjusted under 35 U.S.C. 154(b) by 130 days.

(21) Appl. No.: 16/273,182

(22) Filed: Feb. 12, 2019

(65) Prior Publication Data

US 2019/0171718 A1 Jun. 6, 2019

Related U.S. Application Data

(63) Continuation of application No. PCT/JP2017/038441, filed on Oct. 25, 2017.

(30) Foreign Application Priority Data

Dec. 13, 2016 (JP) .............................. JP2016-241704

(51) Int. Cl.
  *G06F 40/58* (2020.01)
  *G06F 40/55* (2020.01)
  *G06F 40/242* (2020.01)
  *G06F 40/247* (2020.01)
  *G06F 16/338* (2019.01)
(52) U.S. Cl.
  CPC ............ *G06F 40/58* (2020.01); *G06F 16/338* (2019.01); *G06F 40/242* (2020.01); *G06F 40/247* (2020.01); *G06F 40/55* (2020.01)

(58) Field of Classification Search
  CPC ...... G06F 40/58; G06F 16/338; G06F 40/247; G06F 40/242; G06F 40/55
  See application file for complete search history.

(56) References Cited

U.S. PATENT DOCUMENTS

2011/0035207 A1* 2/2011 Abe .................... G06F 40/242
704/2

FOREIGN PATENT DOCUMENTS

JP 5-061908 3/1993
JP 11-053363 2/1999

OTHER PUBLICATIONS

International Search Report of PCT application No. PCT/JP2017/038441 dated Jan. 9, 2018.

* cited by examiner

*Primary Examiner* — Sonia L Gay
(74) *Attorney, Agent, or Firm* — McDermott Will and Emery LLP

(57) ABSTRACT

A translation device is configured to translate from a first language into a second language and includes a first language acquisition unit, a polyseme processor, and a first language output unit. The first language acquisition unit acquires a sentence in the first language. The polyseme processor determines whether or not a word in the second language for a word in the first language included in the sentence is a polyseme, and acquires a plurality of candidate meanings for the word in the second language when the word in the second language is determined as a polyseme. The first language output unit outputs the plurality of candidate meanings.

11 Claims, 17 Drawing Sheets

CHINESE —173

ENGLISH —172

JAPANESE 171D —171
- 171C FRENCH
- 171B GERMAN
- 171A CHINESE

ENGLISH

| POLYSEME | CANDIDATE MEANING | | UNIVOCALLY INTERPRETABLE TRANSLATION WORD |
|---|---|---|---|
| | REPRESENTATIVE DATA | SYNONYMOUS DATA | |
| Bathroom | TOILET (IN JAPANESE) —w1 | LAVATORY, RESTROOM (IN JAPANESE) —w3 | Toilet |
| | SHOWER ROOM (IN JAPANESE) —w2 | BATH, BATHHOUSE (IN JAPANESE) —w4 | Shower room |
| Charge | CHARGING (IN JAPANESE) | ⋮ | Electric charge |
| | FARE (IN JAPANESE) | ⋮ | Fee |
| Nikko | IMAGE 1 (IN JAPANESE) | ⋮ | Nikko |
| | IMAGE 2 (IN JAPANESE) | ⋮ | Nikko |
| ⋮ | ⋮ | ⋮ | ⋮ |

FIG. 6A

TRANSLATION

| The bathroom is over there. |

▼

RETRANSLATION

THE SHOWER ROOM IS OVER THERE (IN JAPANESE) — T1

(W2: SHOWER ROOM)

▼

CORRECTED RETRANSLATION

THE {SHOWER ROOM | TOILET} IS OVER THERE (IN JAPANESE) — T2

(W2: SHOWER ROOM, W1: TOILET)

▼

CORRECTED TRANSLATION

| The bathroom(toilet) is over there. |

FIG. 6B

TRANSLATION

| The bathroom is over there. |

▼

RETRANSLATION

W5
THE BATH IS OVER THERE
(IN JAPANESE)  — T1a

▼

CORRECTED
RETRANSLATION

W2          W1
THE {SHOWER ROOM} {TOILET} IS
OVER THERE (IN JAPANESE)  — T2

▼

CORRECTED
TRANSLATION

The bathroom(toilet) is over there.

FIG. 9A

ORIGINAL

THE [TOILET] IS OVER THERE (IN JAPANESE) — T3

W1

CORRECTED ▼
ORIGINAL

THE {TOILET | SHOWER ROOM} IS OVER THERE (IN JAPANESE) — T4

W1   W2

FIG. 9B
ORIGINAL
CORRECTED ORIGINAL

TRANSLATION TEXT

The bathroom is over there.

CORRECTED TRANSLATION TEXT

The bathroom(toilet) is over there.

FIG. 12A

| FIRST LANGUAGE | UNIVOCAL | REPLACED TRANSLATION WORD | TRANSLATION WORD | ATTRIBUTE |
|---|---|---|---|---|
| TOILET (IN JAPANESE) | KITCHEN (IN JAPANESE) | kitchen | bathroom | POLYSEME |

ORIGINAL

W1          W5
THE TOILET IS ON THE RIGHT AND THE BATH IS
ON THE LEFT (IN JAPANESE)         — T5

▼ TRANSLATION

You will see a toilet on the right side
and a bathroom on the left side

▼ RETRANSLATION

W1
YOU CAN SEE THE TOILET ON THE RIGHT SIDE
AND THE TOILET ON THE LEFT SIDE          — T6
W1 (IN JAPANESE)

▼ CORRECTED TRANSLATION

W1
YOU CAN SEE THE TOILET ON THE RIGHT SIDE AND
THE { TOILET | SHOWER ROOM } ON THE LEFT SIDE   — T7
W1   W2  (IN JAPANESE)

TRANSLATION DEVICE AND TRANSLATION METHOD

TECHNICAL FIELD

The present disclosure relates to a translation device and a translation method for automatic translation of data input in a first language into a second language.

BACKGROUND ART

When the first language including a polyseme is automatically translated into the second language, it has been known that a translation result includes a plurality of translation words in the second language for the polyseme (see PTL 1 and the like).

CITATION LIST

Patent Literature

PTL 1: Unexamined Japanese Patent Publication No. 5-61908

SUMMARY

A speaking person in the first language typically does not understand the second language when the first language is translated into the second language. The speaking person cannot determine whether or not a translation word for a word in the first language is a polyseme. Meanwhile, a speaking target person speaking the second language does not understand the first language. Even if the translation word is a polyseme, it may thus be difficult to select a translation word having a meaning intended by the speaking person in the first language. This may cause misunderstanding in conversation and miscommunication.

The present disclosure provides a translation device and a translation method that reduce a risk of misunderstanding in automatic translation between persons speaking languages different from each other and achieve smooth communication.

The translation device according to the present disclosure is configured to translate from a first language into a second language, and includes a first language acquisition unit, a polyseme processor, and a first language output unit. The first language acquisition unit acquires a sentence in the first language. The polyseme processor determines whether or not a word in the second language for a word in the first language included in the sentence is a polyseme, and acquires a plurality of candidate meanings for the word in the second language when the word in the second language is determined as a polyseme. The first language output unit outputs the plurality of candidate meanings.

The translation method according to the present disclosure relates to translation from a first language into a second language by means of a computer, and includes: acquiring a sentence in the first language; determining whether or not a word in the second language for a word in the first language included in the sentence is a polyseme; acquiring, from a storage, a plurality of candidate meanings for the word in the second language when the word in the second language is determined as a polyseme; and outputting the plurality of candidate meanings.

The translation device and the translation method according to the present disclosure reduce a risk of misunderstanding in automatic translation between persons speaking languages different from each other and effectively achieve smooth communication.

BRIEF DESCRIPTION OF DRAWINGS

FIG. 4 is a schematic configuration view of a polyseme database included in the translation device.

FIG. 6A is a view depicting a partial result of processing executed by the translation device according to the first exemplary embodiment.

FIG. 6B is a view depicting a partial result of processing executed by the translation device according to the first exemplary embodiment.

FIG. 9A is a view depicting a partial result of processing executed by the translation device according to the second exemplary embodiment.

FIG. 9B is a view depicting a partial result of processing executed by the translation device according to the second exemplary embodiment.

FIG. 12A is a view of a polyseme table stored in a translation device according to a third exemplary embodiment.

FIG. 14 is a view depicting an exemplary output of processing executed by a translation device according to a different exemplary embodiment.

DESCRIPTION OF EMBODIMENTS

Exemplary embodiments will now be described in detail below with reference to the drawings where appropriate. The following description may not include unnecessarily detailed description. For example, the following description may not include detailed description of a well-known matter and repeated description of substantially identical configurations. This is to prevent unnecessary redundancy in the following description and to facilitate comprehension by those skilled in the art.

The inventors provide the accompanying drawings and the following description to help those skilled in the art to fully comprehend the present disclosure, with no intention to limit subject matters recited in the claims by means of the drawings and the description.

The present disclosure provides a translation device that effectively facilitates communication involving translation. In a case where "toilet" in Japanese (first language) is translated into "bathroom" in English (second language), "bathroom" means "toilet" as well as "shower room". If a speaking person in Japanese speaks "toilet" that is translated into "bathroom", a speaking target person speaking English may misunderstand that the speaking person means "shower room". The translation device according to the present disclosure is configured to cause the speaking person in the first language to preliminarily recognize such a risk of misunderstanding and effectively facilitate subsequent communication involving translation.

First Exemplary Embodiment

[1-1. Configuration]

Figure 1:
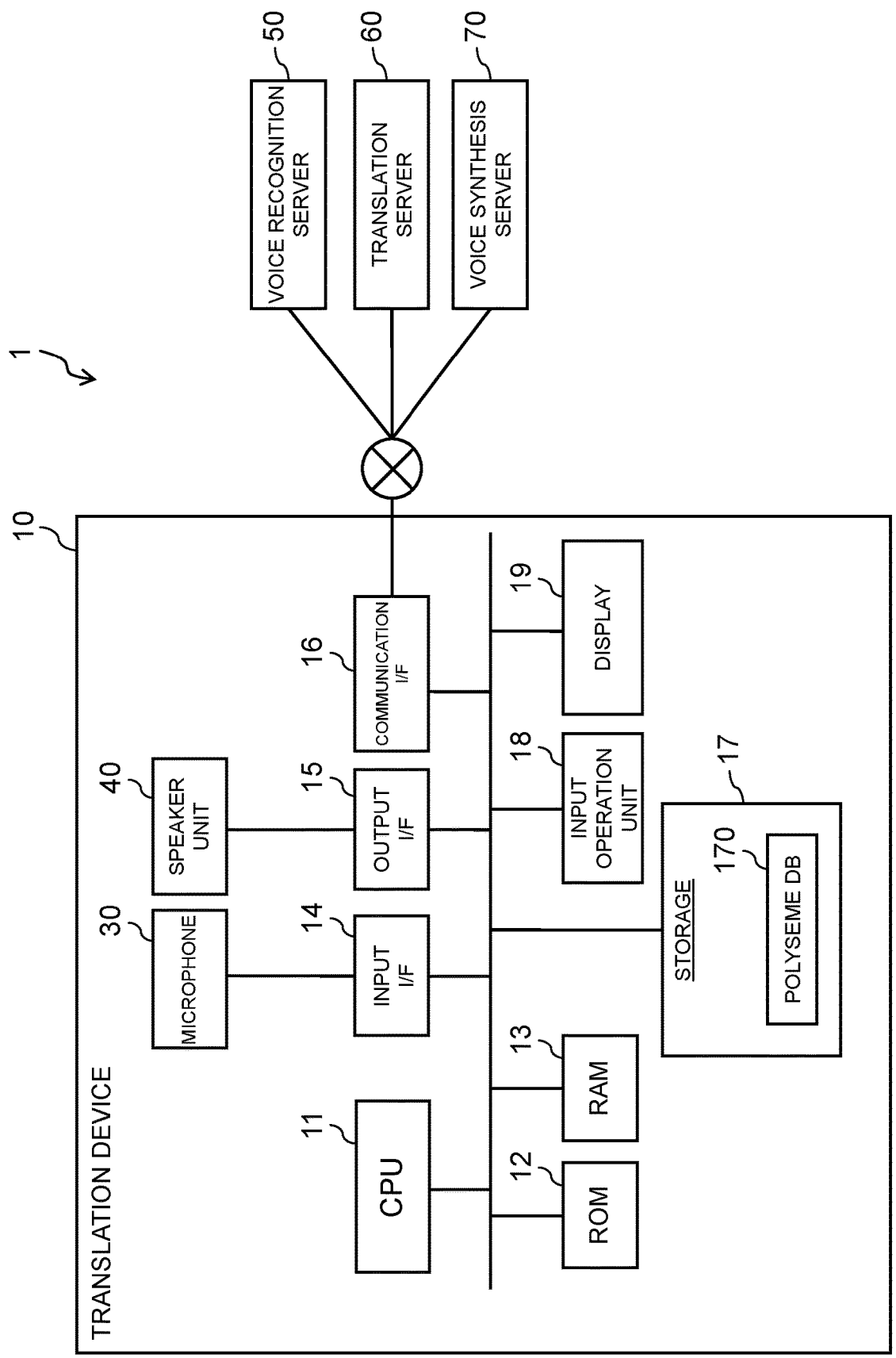
FIG. 1 is a schematic configuration diagram of a translation system according to an example of the present disclosure.

FIG. 1 schematically depicts an entire configuration of translation system 1 according to an exemplary embodiment of the present disclosure. Translation system 1 includes translation device 10, voice recognition server 50, translation server 60, and voice synthesis server 70. Voice recognition server 50, translation server 60, and voice synthesis server 70 are each connectable to translation device 10 via a network.

Each of voice recognition server 50, translation server 60, and voice synthesis server 70 is a computer device including a processor like a central processing unit (CPU), a read only memory (ROM), a random access memory (RAM), a storage, and a communication interface (I/F) configured to communicate with translation device 10. Voice recognition server 50 receives voice data from translation device 10, generates text indicating a voice recognition result, and transmits the text to translation device 10. Translation server 60 receives data of the text from translation device 10, translates the text data into text data in a designated different language, and transmits the translated text data to translation device 10. Voice synthesis server 70 receives the translated text data from translation device 10, generates voice data according to the text data, and transmits the voice data to translation device 10.

[1-1-1. Configuration of Translation Device]

As depicted in FIG. 1, translation device 10 is a computer device including CPU 11, ROM 12, RAM 13, input interface (I/F) 14, output interface (I/F) 15, communication interface (I/F) 16, input operation unit 18, and display 19. Translation device 10 further includes storage 17, microphone 30, and speaker unit 40.

CPU 11 is a processor or a circuit configured to execute processing according to a predetermined program. ROM 12 stores a control program describing a processing procedure of CPU 11, and the like. RAM 13 temporarily stores a control program and data as work memory. Input I/F 14 is a connection unit to be connected to microphone 30 and receives A/D converted voice data from microphone 30. Output I/F 15 is a connection unit to be connected to speaker unit 40 and transmits D/A converted voice to speaker unit 40. Communication I/F 16 is a communication circuit configured to wirelessly or wiredly communicate with each of voice recognition server 50, translation server 60, and voice synthesis server 70.

Input operation unit 18 accepts input operation of a user by means of a touch panel, a keyboard, or a pointing device (e.g., mouse). Display 19 (exemplifying a display unit) is configured by a liquid crystal panel, an organic electroluminescence (EL) panel, or a panel similar to these panels, and displays text data indicating a translation result, and the like.

Storage 17 is a magnetic memory device like a hard disk drive (HDD), or a memory device like a semiconductor memory, and is configured to store programs of an application, an operating system (OS), and the like, as well as various data. Storage 17 stores polyseme database (DB) 170, as to be described later. Storage 17 may be connected as a memory device separate from translation device 10. Storage 17 may be connected to translation device 10 via the Internet or the like.

Figure 2:
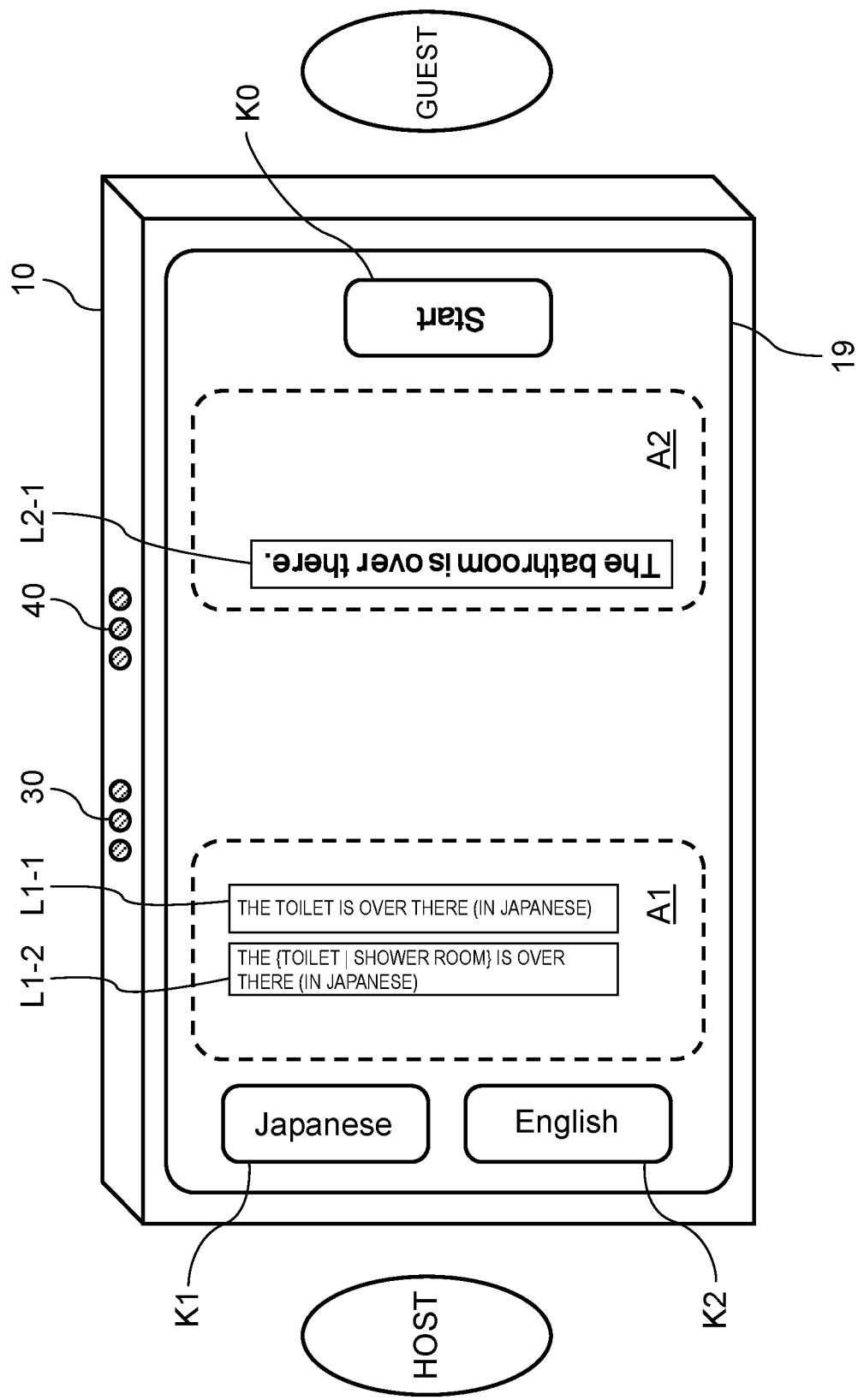
FIG. 2 is an external view of a translation device according to an example of the present disclosure.

FIG. 2 exemplarily depicts translation device 10. Microphone 30 receives utterance by the user of translation device 10 as voice data. Display 19 displays keys K0 to K2 of the touch panel. Key K0 functions as a start button. Key K0 operated by a guest causes start or end of input to microphone 30, of voice in the second language of the guest. Key K1 functions as a start button for the first language as well as a language select button. Key K1 operated by a host causes start or end of input to microphone 30, of voice in the first language of the host. Key K2 functions as a start button for the second language as well as a language select button. Key K2 operated by the host causes start or end of input to microphone 30, of voice in the second language of the guest. Keys K1 and K2 long-pressed or the like cause language switching.

Display 19 has a screen including display area A1 for the first language and display area A2 for the second language. Speaker unit 40 outputs voice data received from voice synthesis server 70. As exemplarily depicted in FIG. 2, display area A1 presents original text L1-1 indicating a voice recognition result of an original sentence spoken by the host using microphone 30. Display area A2 presents translation text L2-1 obtained by translating the original text. Display area A1 presents retranslation text L1-2 obtained by retranslating the translation text. Original text L1-1 and retranslation text L1-2 are presented simultaneously in this case. Only retranslation text L1-2 can alternatively be presented with no presentation of original text L1-1.

[1-1-2. Configuration of CPU]

Figure 3:
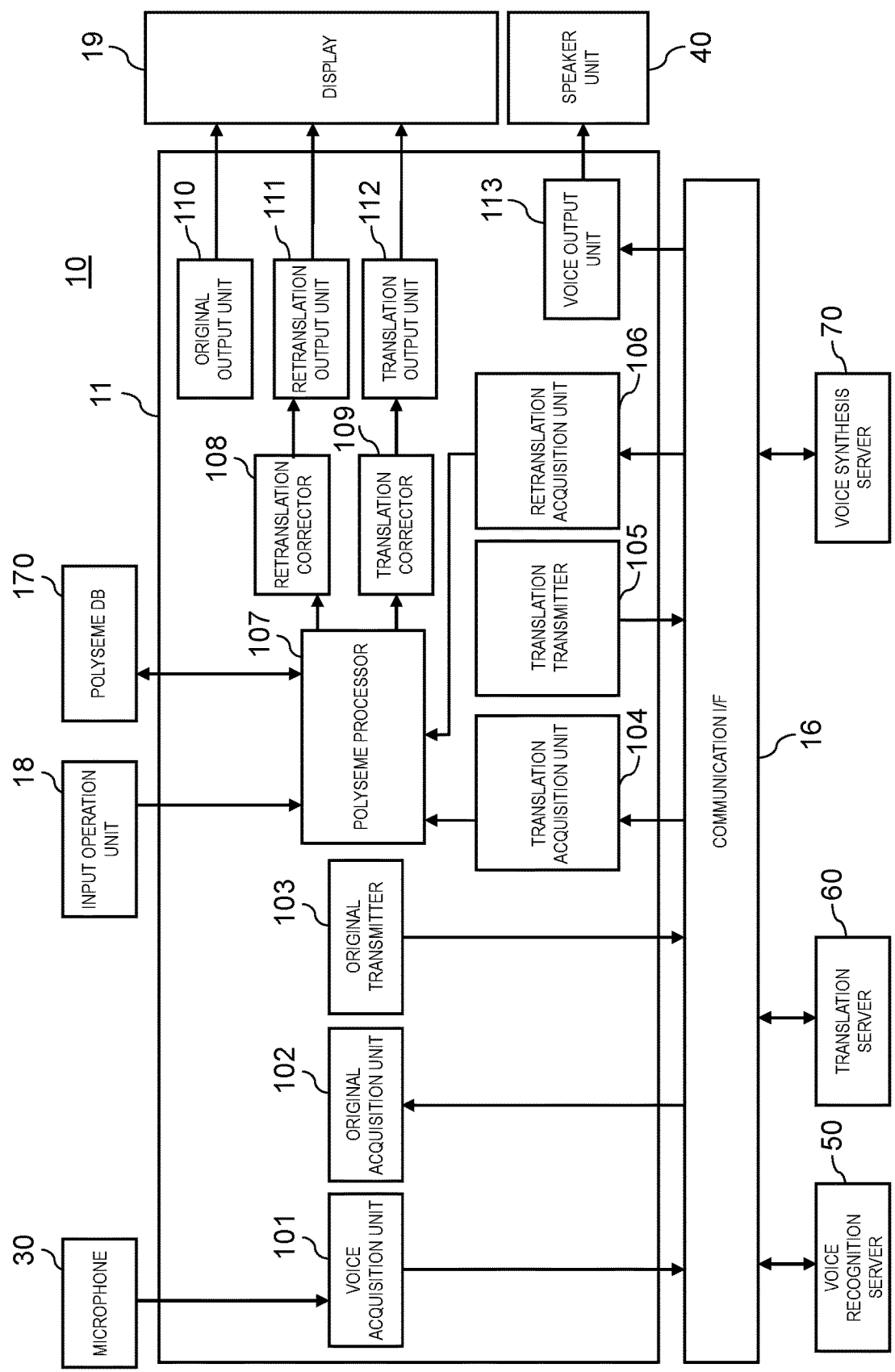
FIG. 3 is a functional configuration diagram of a translation device according to a first exemplary embodiment.

FIG. 3 depicts a configuration of translation device 10. Translation device 10 has a function achieved when mainly CPU 11 executes a predetermined program using a memory area. CPU 11 includes elements or modules described below.

Voice acquisition unit 101 acquires, via microphone 30, voice of the speaking person in the first language (Japanese in this case) as voice data. Voice acquisition unit 101 transmits the voice data thus acquired to voice recognition server 50 via communication I/F 16. Voice recognition server 50 executes voice recognition of the voice data and converts to text data (hereinafter, called original text).

Original acquisition unit 102 (exemplifying a first language acquisition unit) acquires the original text indicating a result of the voice recognition, from voice recognition server 50 via communication I/F 16.

Original transmitter 103 transmits the original text to translation server 60 via communication I/F 16. Translation server 60 translates the original text into the second language (English in this case) to generate translation text.

Translation acquisition unit 104 (exemplifying a second language acquisition unit) acquires the translation text from translation server 60 via communication I/F 16.

Translation transmitter 105 transmits the translation text to translation server 60 via communication I/F 16. Translation server 60 retranslates the translation text in English into Japanese to generate retranslation text.

Generation of such retranslation text helps the speaking person with checking whether or not contents of own utterance is translated appropriately.

Retranslation acquisition unit 106 (exemplifying the first language acquisition unit) acquires the retranslation text from translation server 60 via communication I/F 16.

Polyseme processor 107 determines whether or not the translation text includes any polyseme with reference to polyseme DB 170 (see FIG. 4) to be described later. Polyseme processor 107 further corrects the retranslation text when the translation text includes a polyseme. Specifically, polyseme processor 107 generates retranslation text including a plurality of listed words in the first language for the polyseme, as to be described later. Polyseme processor 107 further corrects the translation text in accordance with input by the user via input operation unit 18. Specifically, polyseme processor 107 refers to polyseme DB 170 when the user selects an intended word from among the plurality of words in the first language for the polyseme. Polyseme processor 107 then acquires a univocally interpretable word in the second language for the selected word in the first language, and corrects the translation text to include the word.

Retranslation corrector 108 corrects the retranslation text in accordance with a command from polyseme processor 107.

Translation corrector 109 corrects the translation text in accordance with a command from polyseme processor 107.

Original output unit 110 outputs the original text to cause display 19 to display the original text acquired by original acquisition unit 102.

Retranslation output unit 111 (exemplifying a first language output unit) outputs the retranslation text to cause display 19 to display the retranslation text.

Translation output unit 112 (exemplifying a second language output unit) outputs the translation text to cause display 19 to display the translation text.

Voice output unit 113 outputs, to speaker unit 40, voice data obtained by conversion of the translation text by voice synthesis server 70.

[1-1-3. Configuration of Polyseme DB]

FIG. 4 schematically depicts a configuration of polyseme DB 170 according to an example of the present disclosure. Polyseme DB 170 stores, when a single word in the second language has a plurality of meanings in the first language, the word in the second language associated with a plurality of corresponding words in the first language.

As depicted in FIG. 4, plural pieces of data 171A, 171B, 171C, 171D, . . . in the second language are stored in association with each of plural pieces of data 171, 172, 173, . . . in the first language. For example, data 171A serves as polyseme data for Japanese as the first language and English as the second language. Data 171, 172, 173 each include a single polyseme in the second language associated with a plurality of candidate meanings in the first language and a univocally interpretable word (univocally interpretable translation word) in the second language for each of the candidate meanings. The plurality of candidate meanings includes representative data (a representative word or a representative image) that is frequently used, for example, and synonymous data (a synonym or a synonymous image) meaning a concept similar to a concept of the representative data. FIG. 4 exemplarily indicates that a word "bathroom" in English as the second language is a polyseme and has a plurality of candidate meanings expressed as words W1, W2, that a plurality of words W3 as synonyms of word W1 as one of the candidate meanings and a plurality of words W4 as synonyms of word W2 also have candidate meanings for the word "bathroom", that word W1 is expressed by a univocally interpretable word "toilet" in the second language, and the like. Word W1 means "toilet" in Japanese. Word W2 means "shower room" in Japanese.

Each of the candidate meanings in the first language is not limited to text (a character string), but can be provided as image data like a picture, a painting, a symbol, a mark, or a drawing, as will be described later.

The present exemplary embodiment exemplifies referring to data 171A for Japanese as the first language and English as the second language.

[1-2. Behavior]

Figure 5:
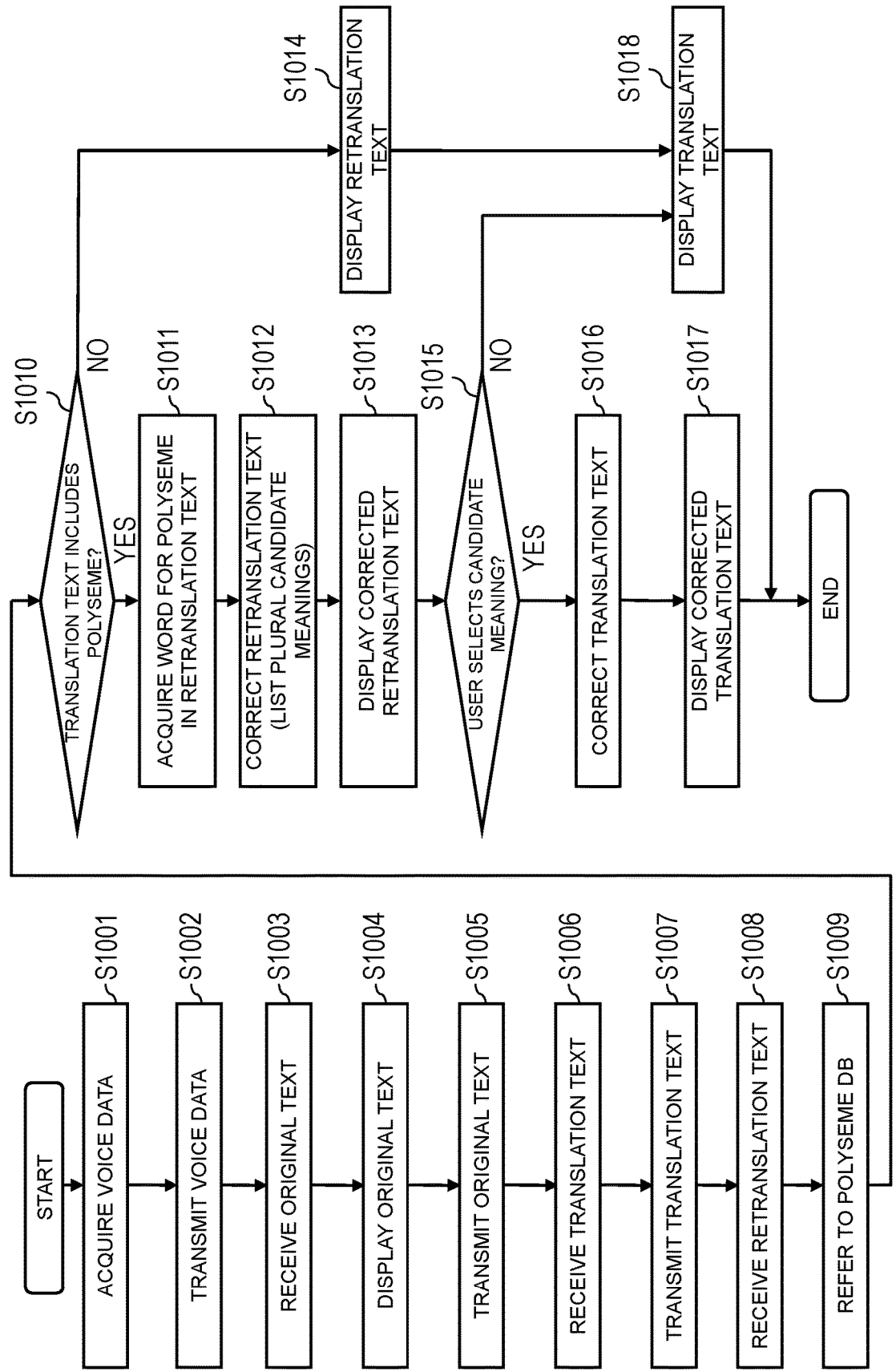
FIG. 5 is a flowchart of processing executed by the translation device according to the first exemplary embodiment.

Described below is processing depicted in FIG. 5 and executed by translation device 10 according to the present first exemplary embodiment. This exemplary description relates to a case of translating contents of utterance by a speaking person in Japanese (first language) as a user and presenting translation contents to a speaking target person speaking English (second language).

S1001: Voice acquisition unit 101 acquires voice data from microphone 30. Assume that the speaking person speaks "The toilet is over there (in Japanese)".

S1002: Voice acquisition unit 101 transmits the voice data to voice recognition server 50.

S1003: Original acquisition unit 102 receives original text obtained by conversion at voice recognition server 50.

S1004: Original output unit 110 outputs the original text thus received to display 19 to cause display 19 to display the original text. Display 19 displays original text L1-1 in this case. If the original text includes any error due to failure in voice recognition, the process flow may return to S1001 for voice reinput.

S1005: Original transmitter 103 transmits the original text to translation server 60.

S1006: Translation acquisition unit 104 receives translation text generated by translation server 60. Translation acquisition unit 104 receives translation text "The bathroom is over there" in this case as indicated in FIG. 6A.

S1007: Translation transmitter 105 transmits the translation text to translation server 60.

S1008: Retranslation acquisition unit 106 receives text obtained by retranslation at translation server 60, of the translation text in the second language into the first language. Retranslation acquisition unit 106 receives retranslation text T1 in this case as indicated in FIG. 6A.

S1009: Polyseme processor 107 refers to polyseme DB 170. As described earlier, selected and referred to in this case is data 171A for Japanese as the first language and English as the second language.

S1010: Polyseme processor 107 determines whether or not the translation text includes any polyseme with reference to data 171A. The word "bathroom" is detected as a polyseme in the translation text "The bathroom is over there" in this case.

S1011: Polyseme processor 107 searches the retranslation text for the plurality of candidate meanings for the word "bathroom". As indicated in FIG. 6A, word W2 in retranslation text T1 is detected as one of the plurality of candidate meanings in this case.

If none of the candidate meanings is detected, similarity between the word in the retranslation text and each of the candidate meanings may be calculated for selecting, as a candidate meaning for the polyseme, the most similar word from among the plurality of candidate meanings.

S1012: Retranslation corrector 108 corrects the retranslation text to include the plurality of obtained candidate meanings listed in the retranslation text, in accordance with a command from polyseme processor 107. In this case, polyseme processor 107 determines that word W2 is a translation word for the polyseme "bathroom", replaces word W2 with "{word W2|word W1}" listing the "plurality of candidate meanings" for the word "bathroom", and outputs corrected retranslation text T2. Corrected retranslation text T2 is output to allow the user to select one of these words.

If word W5 included in retranslation text T1a corresponds to a synonym among the plurality of candidate meanings in data 171A as exemplified in FIG. 6B, the "plurality of candidate meanings" is listed by means of not word W5 as the synonym but word W2 having a candidate meaning expressed by a representative word. Even in a case where the word corresponding to the polyseme obtained in S1011 is included as a synonym, output is the candidate meaning expressed by the representative word of the synonym. Word W5 itself detected for listing the "plurality of candidate meanings" can alternatively be adopted to output text including {word W5|word W1} as corrected retranslation text.

Listing the plurality of candidate meanings is thus selecting a word to be listed from among the "plurality of candidate meanings" including a synonym in polyseme DB 170. Words can alternatively be listed to cover all the meanings of the polyseme.

S1013: Retranslation output unit 111 causes display 19 to display the corrected retranslation text. As indicated in FIG. 6A, displayed in this case is corrected retranslation text T2 including {word W2|word W1}.

S1014: In another case where the translation text includes no polyseme, polyseme processor 107 causes display 19 via retranslation output unit 111 to display the retranslation text acquired from translation server 60.

S1015: If the user selects one of the selectable words in the retranslation text via input operation unit 18, the process flow proceeds to S1016. For example, the user can achieve word selection by touching a position of word W1 in {word W2|word W1}. If the user executes no selection for a certain period of time or selects a button indicating no selection, it is regarded that word selection has not been executed and the process flow proceeds to S1018.

S1016: Polyseme processor 107 searches polyseme DB 170 and acquires a univocally interpretable translation word for the word selected in S1015 (an element having a meaning corresponding to the single candidate meaning thus selected). Translation corrector 109 then corrects the translation text. The word "toilet" for word W1 is acquired as a univocally interpretable translation word in this case, and the translation text is corrected through addition of "toilet" or replacement with "toilet" to enable the translation text to indicate that "bathroom" means toilet.

S1017: Translation output unit 112 causes display 19 to display the corrected translation text. When "toilet" is added, a message "The bathroom (toilet) is over there" is displayed as exemplified in FIG. 6A. When "bathroom" is replaced with "toilet", displayed is a message "The toilet is over there".

S1018: If the translation text does not include any polyseme in S1010 or if the user does not select any word in the retranslation text in S1015, displayed is translation text ("The bathroom is over there" in this case) acquired from translation server 60.

If the user does not select any one of the candidate meanings in the retranslation text in S1015 and selects one of the candidate meanings in the retranslation text after elapse of a predetermined period from display of the translation text on display 19 in S1018, the process flow can alternatively transition to S1016 or S1017. If the user selects any one of candidate meanings in the retranslation text in this case, the translation text having been already displayed is also corrected to be displayed.

[1-3. Features and Others]

Translation device 10 according to the above exemplary embodiment is configured to determine whether or not contents translated from the first language into the second language include any polyseme in the second language, and output, in the first language, a result of the determination. The speaking person in the first language can thus preliminarily recognize that the contents translated into the second language include a polyseme and thus the speaking target person may not understand an idea of the speaking person. Accordingly, the speaking person in the first language can take measures to prevent misunderstanding, or can find a cause for misunderstanding if any and appropriately handle the situation. The speaking person in the first language can thus achieve smooth communication with the speaking target person speaking the second language.

This configuration particularly prevents the speaking person in the first language from misunderstanding that translation is executed incorrectly when the speaking person reads the retranslation text to check whether or not translation is correct and finds that the translation text includes a polyseme interpreted to have an unintended meaning.

The user can select the candidate meaning intended by the speaking person in the first language, from among the plurality of candidate meanings in the retranslation text in the first language. Translation device 10 corrects the translation text to include the univocally interpretable translation word in the second language in accordance with the selection, and outputs the translation text thus obtained. The speaking person in the first language can thus more accurately express contents intended by the speaking person to the speaking target person speaking the second language.

Polyseme DB 170 includes a single polyseme in the second language associated with a plurality of candidate meanings including a synonym in the first language. Polyseme DB 170 enables detection of the plurality of candidate meanings for the polyseme even though translation server 60 has various translation results.

The function of translation device 10 can be executed by translation device 10 disposed at a client, without modification of translation processing by translation server 60. The function is accordingly achieved with no modification in system design and no increase in memory resource.

Determining whether or not any polyseme is included in at least one word in the second language for a word included in text in the first language includes at least one of determination of whether or not a single word in the second language for the word included in the text in the first language is a polyseme, and determination of whether or not any one of words in the second language for the word included in the text in the first language is a polyseme.

Second Exemplary Embodiment

The second exemplary embodiment of the present disclosure will now be described below. Configurations and functions similar to configurations and functions according to the first exemplary embodiment may not be described repeatedly and same drawings and reference marks may be referred to.

[2-1. Configuration]

Translation system 1, voice recognition server 50, translation server 60, voice synthesis server 70, and polyseme DB 170 according to the present exemplary embodiment are configured similarly to those according to the first exemplary embodiment (see FIGS. 1, 2, and 4).

The present exemplary embodiment provides translation device 20 different from translation device 10 according to the first exemplary embodiment in that translation device 20 is configured to output a plurality of candidate meanings in the first language for a polyseme in the second language, in original text instead of retranslation text.

Figure 7:
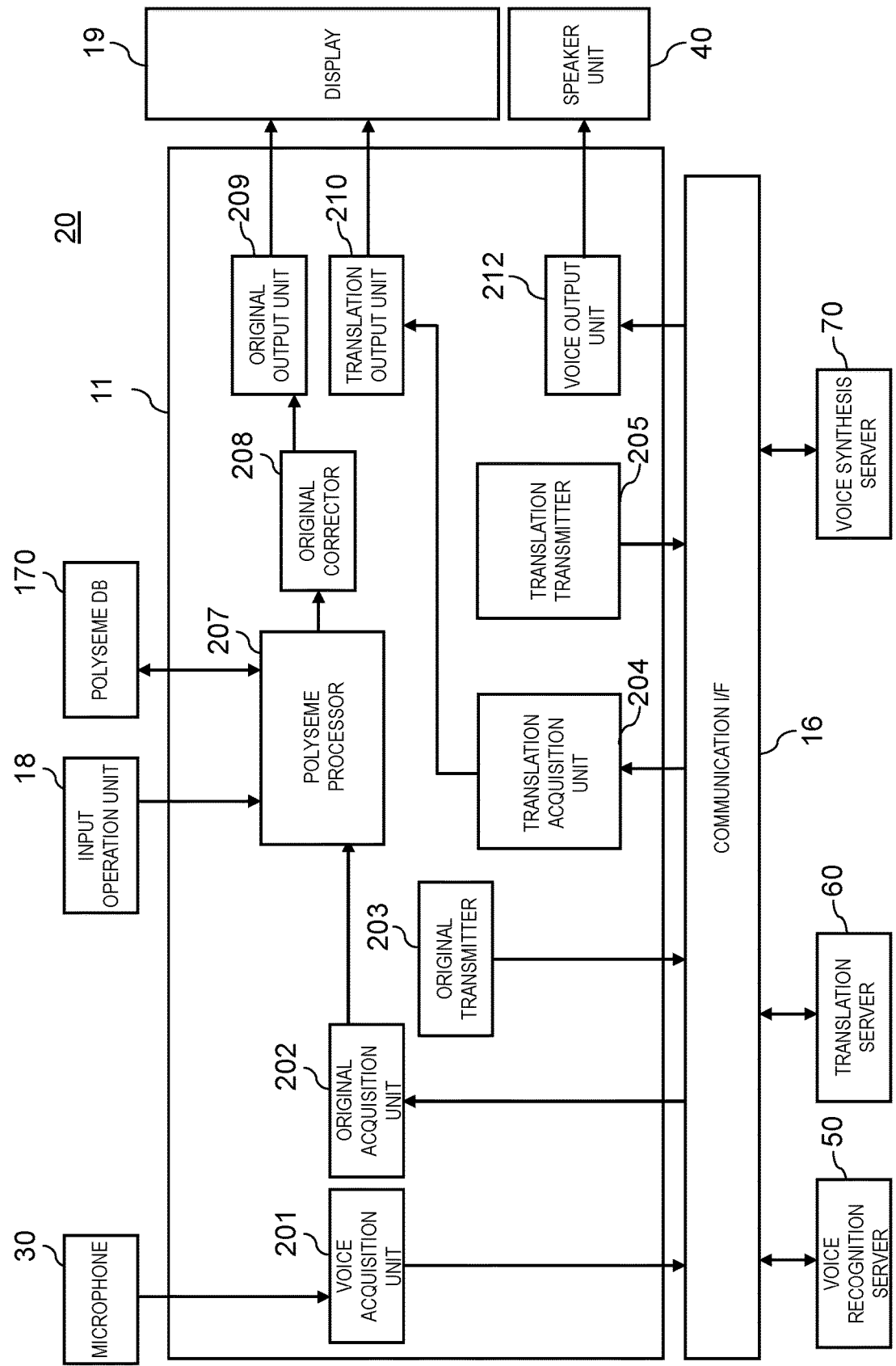
FIG. 7 is a functional configuration diagram of a translation device according to a second exemplary embodiment.

FIG. 7 depicts a configuration of translation device 20 according to the present second exemplary embodiment. Translation device 20 has a function achieved when mainly CPU 11 executes a predetermined program using a memory area. CPU 11 includes elements or modules described below.

Voice acquisition unit 201, original transmitter 203, translation acquisition unit 204, translation transmitter 205, and voice output unit 212 are configured similarly to voice acquisition unit 101, original transmitter 103, translation acquisition unit 104, translation transmitter 105, and voice output unit 113 according to the first exemplary embodiment, respectively.

Original acquisition unit 202 (exemplifying a first language acquisition unit) acquires original text indicating a voice recognition result, from voice recognition server 50 via communication I/F 16.

Polyseme processor 207 determines whether or not text in the second language corresponding to the original text possibly includes any polyseme with reference to polyseme DB 170. Polyseme processor 207 further corrects the original text when the text in the second language corresponding to the original text possibly includes any polyseme. Specifically, polyseme processor 207 generates original text including a plurality of listed words in the first language for the polyseme in the second language, as to be described later.

Original corrector 208 corrects the original text in accordance with a command from polyseme processor 207.

Original output unit 209 (exemplifying a first language output unit) outputs the corrected original text to cause display 19 to display the original text.

Translation output unit 210 (exemplifying a second language output unit) outputs translation text acquired by translation acquisition unit 204 to cause display 19 to display the translation text.

[2-2. Behavior]

Figure 8:
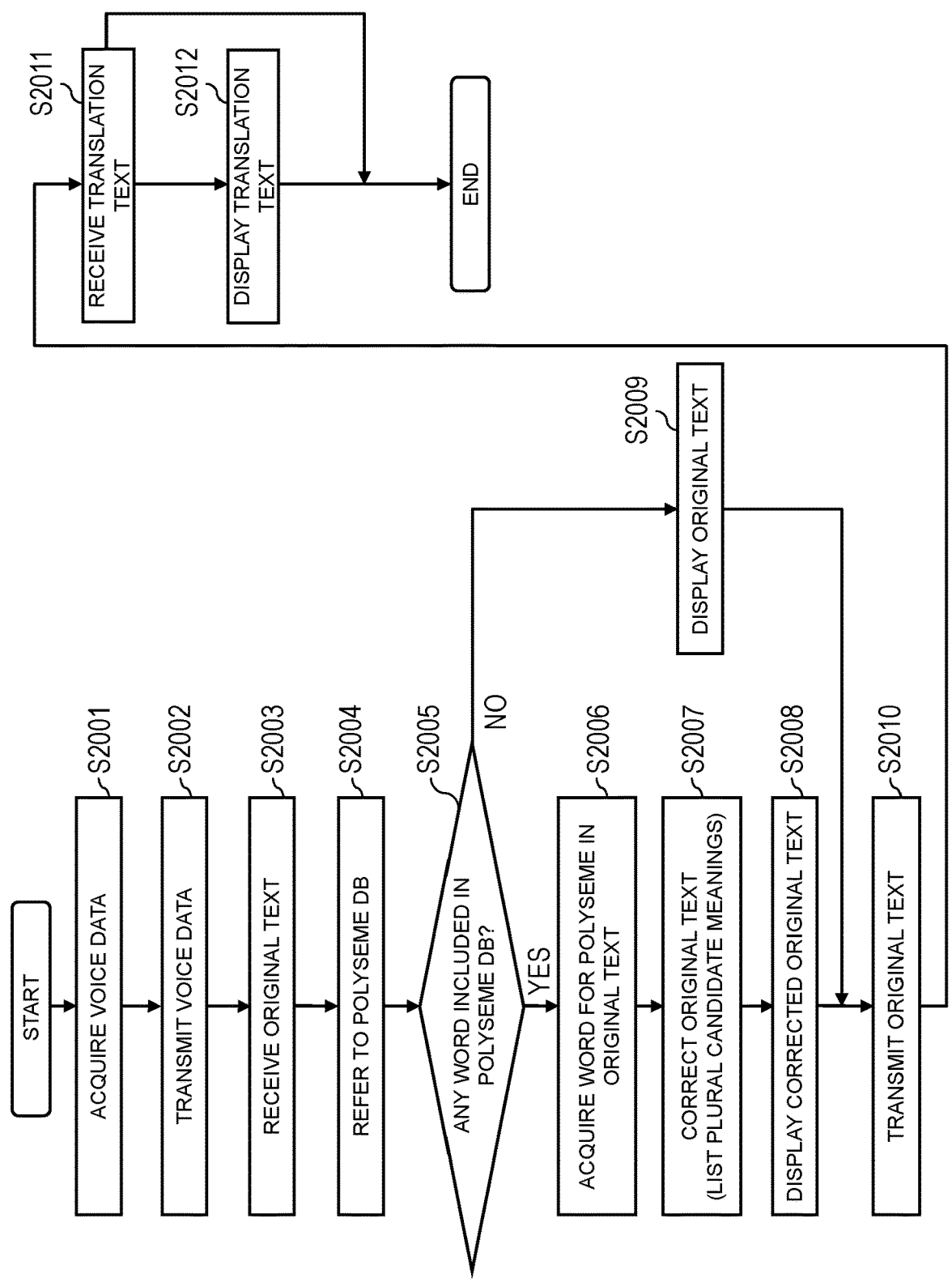
FIG. 8 is a flowchart of processing executed by the translation device according to the second exemplary embodiment.

Described below is processing depicted in FIG. 8 and executed by translation device 20 (principally CPU 11) according to the present second exemplary embodiment. This exemplary description relates, as in the first exemplary embodiment, to a case of translating contents of utterance by a speaking person in Japanese (first language) as a user and presenting translation contents to a speaking target person speaking English (second language).

S2001: Voice acquisition unit 201 acquires voice data from microphone 30. Voice acquisition unit 201 acquires voice of the speaking person in Japanese as the user. Specifically, assume that the speaking person speaks original text T3 indicated in FIG. 9A.

S2002: Voice acquisition unit 201 transmits the voice data to voice recognition server 50.

S2003: Original acquisition unit 202 receives original text obtained by conversion at voice recognition server 50.

S2004: Polyseme processor 207 refers to polyseme DB 170 (see FIG. 4). As described earlier, selected and referred to in this case is data 171A for Japanese as the first language and English as the second language.

S2005: It is determined whether or not the original text includes any one of a plurality of candidate meanings in polyseme DB 170. Determined in this case is that word W1 in original text T3 is included in polyseme DB 170. Word W1 is determined as possibly being translated into bathroom as a polyseme.

Similar determination is made also when, among the plurality of candidate meanings in polyseme DB 170, a word in the first language in the original text is a synonym. Specifically, when original text T3a includes word W6 as a synonym as indicated in FIG. 9B, it is determined that word W6 is included in polyseme DB 170.

S2006: Polyseme processor 207 acquires a plurality of candidate meanings (word W1 and word W2) for a representative word for "bathroom", in original text T3.

When the word in the original text corresponding to the polyseme is a synonym (e.g., word W6), polyseme processor 207 acquires word W6 and replaces word W6 with the plurality of candidate meanings (word W1 and word W2) for the representative word.

S2007: Original corrector 208 corrects the original text to include the plurality of obtained candidate meanings listed in the original text in accordance with a command from polyseme processor 207. In this case, polyseme processor 207 replaces word W1 with the listed "plurality of candidate meanings", specifically, "{word W1|word W2}" as indicated in FIG. 9A, and outputs corrected original text T4.

As in the first exemplary embodiment, word W6 itself detected for listing the "plurality of candidate meanings" can alternatively be adopted to output corrected original text T4a (see FIG. 9B) as text including {word W2|word W6}.

S2008: Original output unit 209 causes display 19 to display the corrected original text. As indicated in FIG. 9A, original output unit 209 causes display of corrected original text T4 including {word W1|word W2}.

If the original text includes any error due to failure in voice recognition, the process flow may return to S2001 for voice reinput.

S2009: In another case where the original text has no possibility of including any word corresponding to a polyseme, polyseme processor 207 causes display 19 via original output unit 209 to simply display the original text. If the original text includes any error due to failure in voice recognition, the process flow may return to S2001 for voice reinput.

S2010: The original text is transmitted to translation server 60.

S2011: Translation text generated by translation server 60 is received.

S2012: Display 19 displays the translation text thus received.

[2-3. Features and Others]

Translation device 20 according to the above exemplary embodiment is configured to determine whether or not contents translated from the first language into the second language possibly include any polyseme without waiting for translation processing by translation server 60, and output a result of the determination. The speaking person in the first language can thus preliminarily recognize that the contents translated into the second language possibly include a polyseme and the speaking target person may not understand an idea of the speaking person. Accordingly, the speaking person in the first language can take measures to prevent misunderstanding, or can find a cause for misunderstanding if any and appropriately handle the situation. The speaking person in the first language can thus achieve smooth communication with the speaking target person speaking the second language.

As in the first exemplary embodiment, polyseme DB 170 includes a single polyseme in the second language associated with a plurality of candidate meanings including a synonym in the first language. Polyseme DB 170 thus enables detection of the plurality of candidate meanings for the polyseme even though translation server 60 has various translation results.

Similarly to the first exemplary embodiment, the function of translation device 20 can be executed at a client, without modification of translation processing by translation server 60. The function is accordingly achieved with no modification in system design and no increase in memory resource.

[2-4. Modification Examples]

Figure 10:
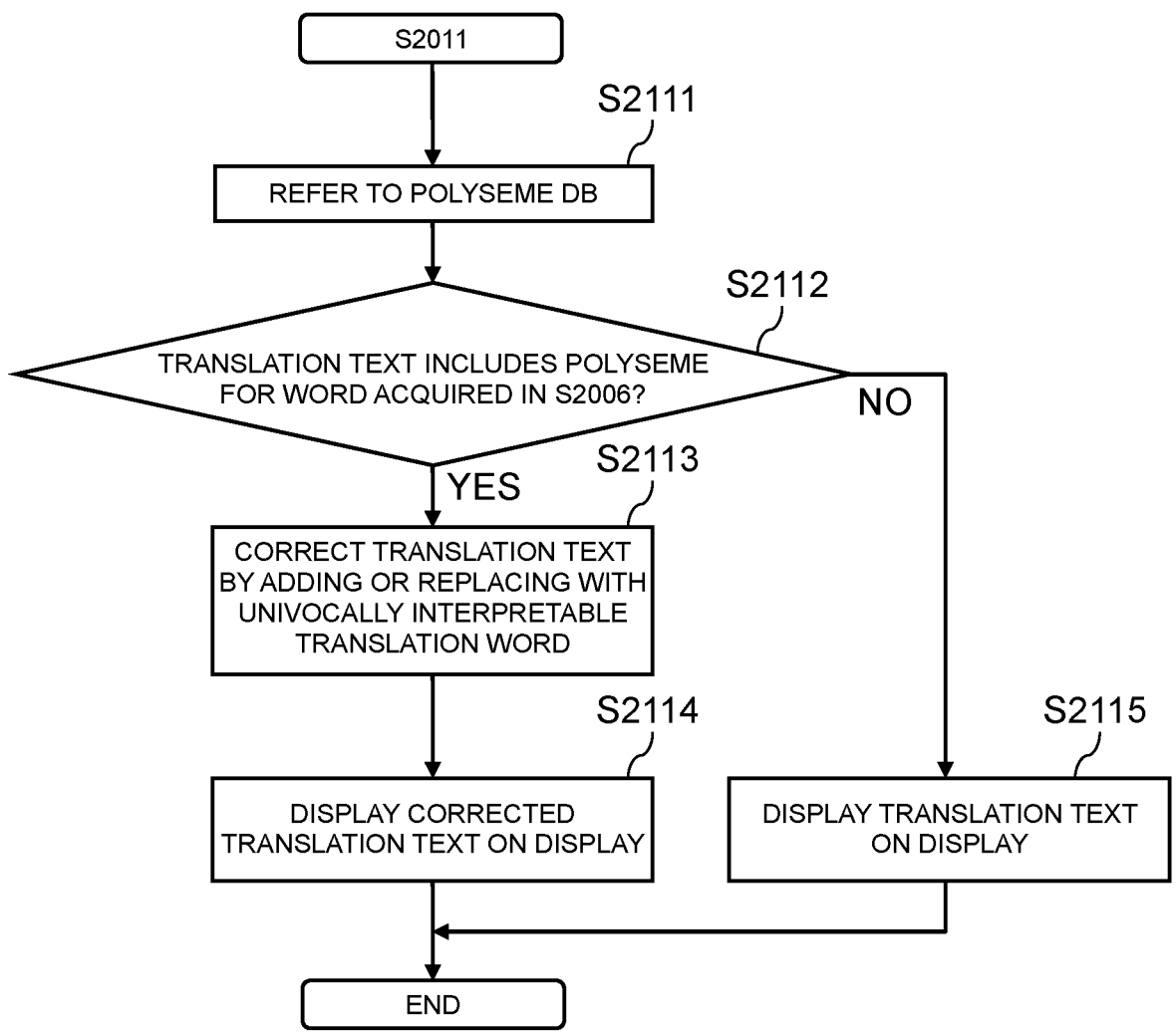
FIG. 10 is a flowchart of processing executed by a translation device according to a modification example of the second exemplary embodiment.

Similarly to the first exemplary embodiment, when there is any polyseme, translation device 20 according to the above second exemplary embodiment can alternatively be configured to add or replace with a univocally interpretable translation word in the displayed translation text. Described below with reference to FIG. 10 is a processing procedure obtained by replacing S2012 depicted in FIG. 8 with the following processing.

S2111: After reception of the translation text in S2011 depicted in FIG. 8, polyseme processor 207 refers to polyseme DB 170. Data 171A (see FIG. 4) is selected for reference in this case.

S2112: Polyseme processor 207 determines whether or not the translation text includes a polyseme (bathroom) for the word acquired in S2006 with reference to data 171A. The process flow proceeds to S2113 if the translation text includes bathroom, whereas the process flow proceeds to S2115 if the translation text does not include bathroom.

S2113: Polyseme processor 207 searches polyseme DB 170 and acquires a univocally interpretable translation word for the polyseme determined in S2112. Original corrector 208 then corrects the translation text, similarly to translation corrector 109 according to the first exemplary embodiment. Original corrector 208 acquires "toilet" as a univocally interpretable translation word in this case, and corrects the translation text through addition of "toilet" or replacement with "toilet" to enable the translation text to indicate that "bathroom" means toilet.

Figure 11:
FIG. 11 is a view depicting a partial result of processing executed by the translation device according to the modification example of the second exemplary embodiment.

S2114: Translation output unit 210 causes display 19 to display the corrected translation text. Displayed in this case is a message "The bathroom (toilet) is over there" as exemplified in FIG. 11. When "bathroom" is replaced with "toilet", displayed is a message "The toilet is over there".

S2115: If the translation text does not include any polyseme in S2112, translation output unit 210 outputs to cause display 19 to display the translation text ("The bathroom is over there" in this case) received from translation server 60.

When the translation text is determined as including a polyseme in accordance with determination of whether or not the original text in the first language possibly includes a word corresponding to the polyseme, translation output unit 210 outputs the translation text including a univocally interpretable translation word in the second language. The speaking person in the first language can thus more accurately express contents intended by the speaking person to the speaking target person speaking the second language.

Third Exemplary Embodiment

Translation device 10 according to the first exemplary embodiment determines whether or not a word in the second language is a polyseme, and outputs a plurality of candidate meanings if the word in the second language is determined as a polyseme. The user of translation device 10 needs to select one of the candidate meanings.

In view of this, translation device 10 according to the present exemplary embodiment transmits, to the translation server, a sentence including a univocal in the first language when the word in the second language is determined as a polyseme. The translation server translates and retranslates this sentence. Translation device 10 according to the present exemplary embodiment achieves decrease in inconsistency between an original sentence in the first language and a retranslation sentence without need for selection by the user.

The third exemplary embodiment of the present disclosure will be described below with reference to FIGS. 1 to 3, 12A, and 12B. Configurations and functions similar to configurations and functions according to the first exemplary embodiment may not be described repeatedly and same drawings and reference marks may be referred to. Similarly to the first exemplary embodiment, the present exemplary embodiment will be described assuming that the first language is Japanese and the second language is English.

[3-1. Behavior]

Storage 17 of translation device 10 stores polyseme table 180 exemplified in FIG. 12A. Polyseme table 180 includes word W11 in Japanese (word meaning toilet), univocal W12 (word meaning kitchen) in Japanese for word W11, replaced translation word W13 (kitchen) in English for word W12, and translation word W14 (bathroom) in English for word W11. Specifically, translation word W14 is obtained by translating word W11 into English. Replaced translation word W13 is obtained by translating univocal W12 into English. Word W11 and univocal W12 can belong to a single category of words. Word 11 and univocal W12 belong to a category of words meaning places. Univocal W12 may not have a meaning identical to the meaning of word W11. Polyseme table 180 also includes an attribute of translation word W14. Polyseme table 180 includes, as the attribute of translation word W14, that translation word W14 is a polyseme. Univocal W12 is univocally translated to kitchen as replaced translation word W13 through translation processing by translation server 60.

Figure 12B:
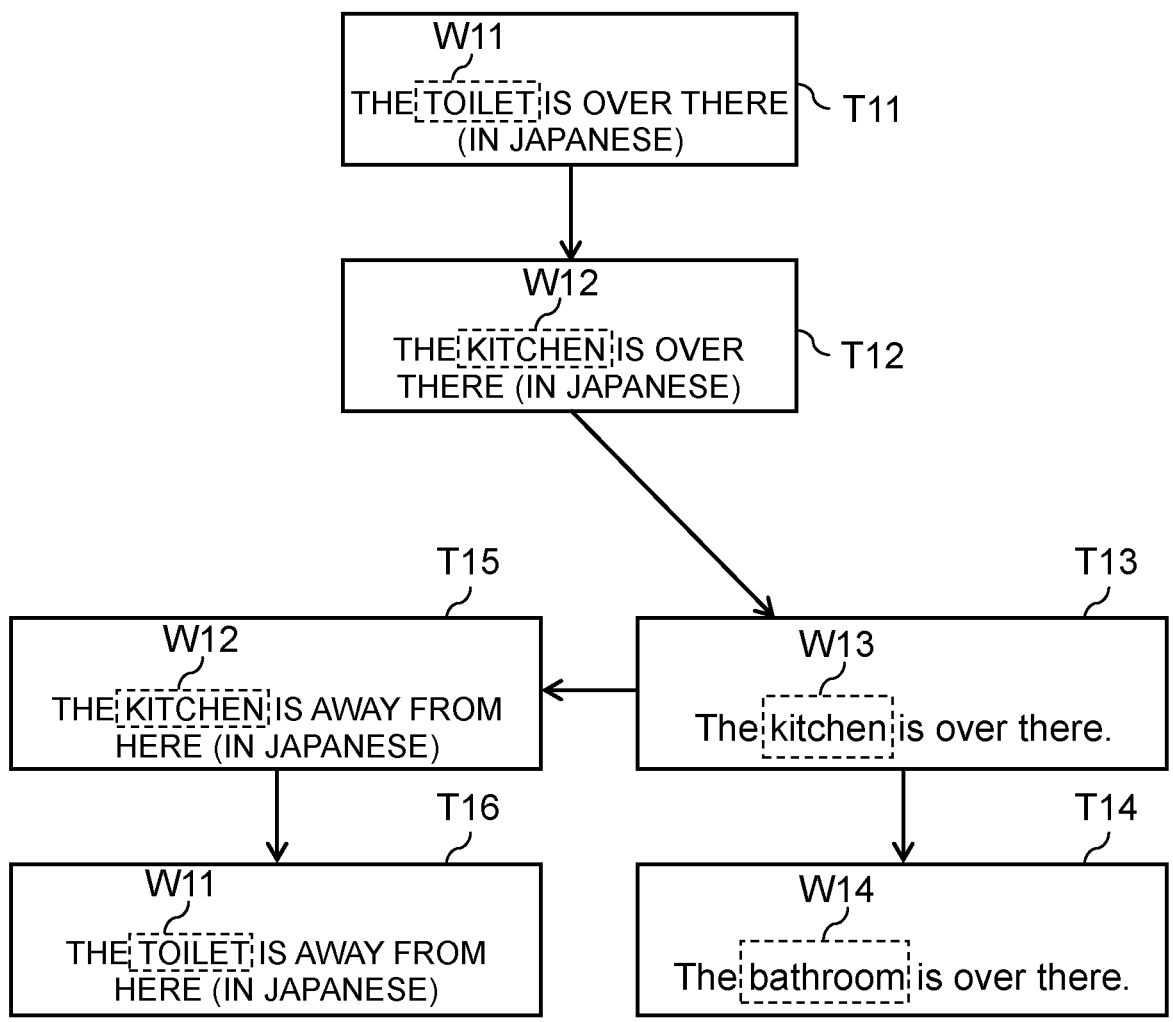
FIG. 12B is a view depicting a partial result of processing executed by the translation device according to the third exemplary embodiment.

Translation device 10 according to the present exemplary embodiment will be described in detail in terms of behavior with reference to FIGS. 3 and 12B.

Original acquisition unit 102 of translation device 10 acquires, via communication I/F 16 (exemplifying a communication unit), original sentence T11 in Japanese indicating a result of voice recognition executed by voice recognition server 50. Original sentence T11 includes word W11.

Polyseme processor 107 determines whether or not translation word W14 for word W11 included in original sentence T11 is a polyseme, with reference to polyseme table 180 stored in storage 17. Specifically, polyseme processor 107 checks the attribute of translation word W14 with reference to polyseme table 180. If the attribute of translation word W14 describes that translation word W14 is a polyseme, polyseme processor 107 determines that translation word W14 is a polyseme. When polyseme processor 107 determines that translation word W14 is a polyseme, polyseme processor 107 replaces word W11 with univocal W12 to generate replaced sentence T12 in Japanese.

Communication I/F 16 transmits replaced sentence T12 to translation server 60 (see FIG. 1).

Translation server 60 translates replaced sentence T12 into English to generate replaced translation sentence T13 in English. As described above, univocal W12 included in replaced sentence T12 is univocally translated to replaced translation word W13 through translation processing by translation server 60. In other words, replaced translation sentence T13 includes replaced translation word W13.

Translation server 60 further retranslates replaced translation sentence T13 into Japanese to generate replaced retranslation sentence T15. Similarly to the above, replaced translation word W13 included in replaced translation sentence T13 is univocally retranslated to univocal W12 through retranslation processing by translation server 60. In other words, replaced retranslation sentence T15 includes univocal W12.

Communication I/F 16 receives replaced translation sentence T13 in English and replaced retranslation sentence T15 in Japanese.

Retranslation corrector 108 acquires replaced retranslation sentence T15 in Japanese via communication I/F 16. Retranslation corrector 108 replaces univocal W12 included in replaced retranslation sentence T15 with word W11 with reference to polyseme table 180. Retranslation corrector 108 accordingly generates retranslation sentence T16 in Japanese. Retranslation output unit 111 outputs retranslation sentence T16. Specifically, retranslation output unit 111 causes retranslation sentence T16 to be presented in display area A1 of display 19.

Translation corrector 109 acquires replaced translation sentence T13 in English via communication I/F 16. Translation corrector 109 replaces replaced translation word W13 included in replaced translation sentence T13 with translation word W14 with reference to polyseme table 180. Translation corrector 109 accordingly generates translation sentence T14 in English. Translation output unit 112 outputs translation sentence T14. Specifically, translation output unit 112 causes translation sentence T14 to be presented in display area A2 of display 19.

In this manner, translation device 10 achieves output of retranslation sentence T16 without need for selection of a candidate meaning by the user.

[3-2. Features and Others]

Translation device 10 according to the present exemplary embodiment determines whether or not translation word W14 in the second language is a polyseme, with reference to polyseme table 180 stored in storage 17. If translation word W14 is a polyseme, translation device 10 replaces word W11 in Japanese for translation word W14 with univocal W12. Translation device 10 thus achieves decrease, at translation device 10, in inconsistency between sentence T11 and retranslation sentence T16, without modification of translation processing by translation server 60.

Other Exemplary Embodiments

The first to third exemplary embodiments have been described above to exemplify the techniques disclosed in the present application. The techniques according to the present disclosure are not limited by these exemplary embodiments, and are applicable to other exemplary embodiments obtained through change, replacement, addition, elimination, or the like where appropriate. Furthermore, constituent elements and functions according to the first to third exemplary embodiments can be combined to obtain new exemplary embodiments.

Such other exemplary embodiments will be described below.

[1]

Figure 13:
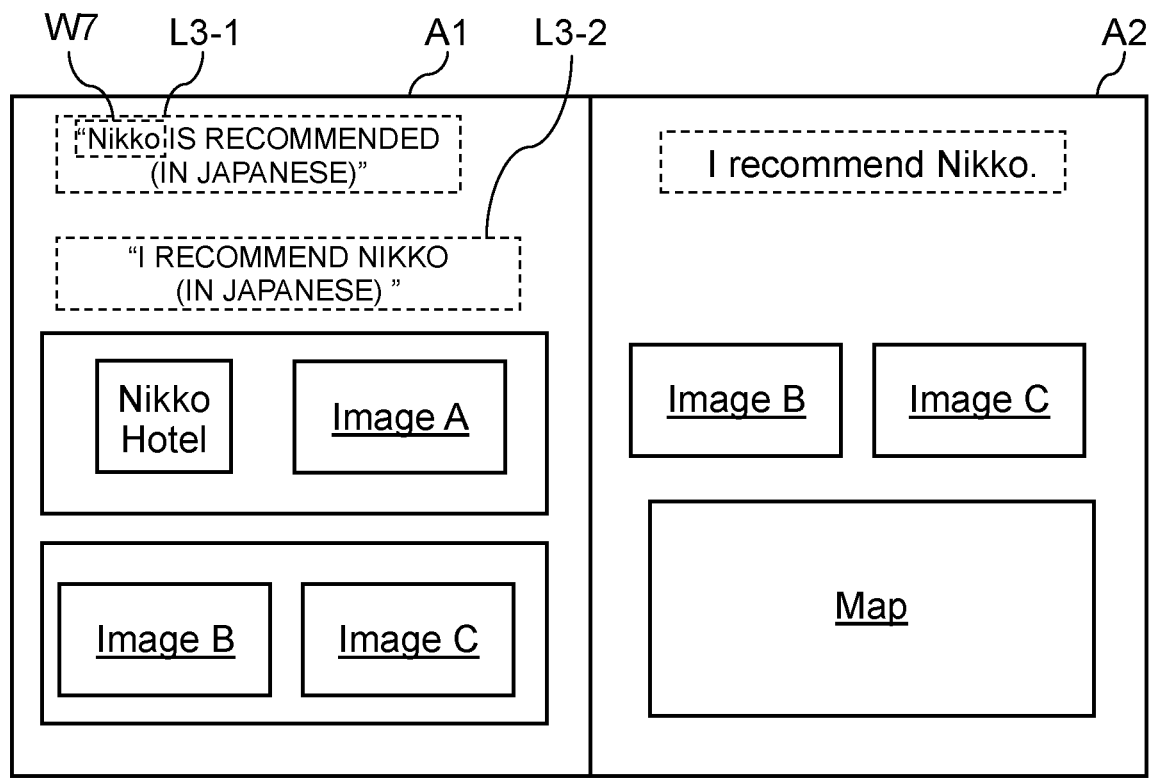
FIG. 13 is a view depicting an exemplary output of processing executed by a translation device according to a different exemplary embodiment.

FIG. 13 depicts an exemplary screen on display 19 of translation device 10 or translation device 20 according to one of the above exemplary embodiments. Similarly to the screen depicted in FIG. 2, this screen includes display area A1 for the first language and display area A2 for the second language. This example relates to presentation of a plurality of candidate meanings not in the form of text but in the form of drawings or pictures.

In a case where original text L3-1 including word W7 is acquired, word (Nikko) in the second language for word W7 is determined as a polyseme. Retranslation text thus acquired (or original text) is processed by polyseme processor 107 or polyseme processor 207 in this case. Displayed are text L3-2 obtained by replacing with "Nikko" as well as selectable pictures indicating two meanings of Nikko. FIG. 13 includes a middle portion depicting Nikko as a hotel name and image picture A of the hotel, and a lower portion depicting image pictures B, C of Nikko as a sightseeing site. The speaking person in the first language can check these image pictures and select an intended one of the meanings for Nikko. The speaking person selects the image pictures of Nikko as a sightseeing site in this case. Accordingly, display area A2 presents, to the speaking target person speaking the second language, image pictures B, C and an image such as a map relevant to the sightseeing site Nikko thus selected.

Images like a painting, a mark, and a symbol can be adopted in addition to the pictures and the map, to present relevance of the word to a polyseme.

[2]

Retranslation according to the first exemplary embodiment may lead to output of duplicated words. Assume an exemplary case where original text is text T5 in the first language indicated in FIG. 14 and acquired translation text is "You will see a toilet on the right side and a bathroom on the left side". In this case, retranslation text may be text T6 including words W1 twice. It is impossible to determine which one of two words W1 in text T6 corresponds to toilet or bathroom.

In such a case, translation device 10 (1) accesses translation server 60, acquires translation correlation information on each word, and determines which one of words W1 corresponds to toilet. Translation device 10 alternatively (2) determines which one of words W1 corresponds to toilet in accordance with placement of words, or the like. Translation device 10 accordingly determines which one of words W1 is translated to Bathroom, and corrects word W1 for Bathroom with {word W1|word W2} in retranslation text. Translation device 10 can thus output text T7 as corrected translation text.

[3]

Translation device 10 or translation device 20 according to one of the above exemplary embodiments has processing functions, entirety or appropriate part of which can alternatively be executed on a control circuit of the CPU (or a microcomputer such as a micro processing unit (MPU) or a micro controller unit (MCU)). Entirety or appropriate part of the processing functions can still alternatively be executed on a program analyzed and executed by the CPU (or a microcomputer such as an MPU or an MCU) or on hardware configured by wired logic.

Translation device 10 or translation device 20 can alternatively be configured by a single or plurality of processors or circuits. Translation device 10 or translation device 20 can still alternatively be configured by a single or plurality of semiconductor chips.

[4]

Translation device 10 or translation device 20 according to one of the above exemplary embodiments acquires voice in the first language, but can alternatively directly acquire text in the first language as original text.

[5]

The above exemplary embodiments each include correcting displayed text and listing candidate meanings, but can alternatively include listing a plurality of candidate meanings by means of voice output.

[6]

The above exemplary embodiments are not limited to separately providing voice recognition server 50, translation server 60, and voice synthesis server 70. All or part of these servers can alternatively be included in a single computer device.

[7]

The processing procedures (in FIGS. 5, 8, 10, and the like) according to the above exemplary embodiments are not limitedly executed in the orders described in the above exemplary embodiments, but can alternatively be executed in orders changed within the range not departing from the gist of the invention.

[8]

Translation device 10 or translation device 20 according to the present disclosure is not limitedly achieved in accordance with the corresponding exemplary embodiment. A translation method and a computer program executed by translation device 10 or translation device 20, and a computer-readable recording medium including the program are included in the scope of the present disclosure. Examples of the computer-readable recording medium include a flexible disk, a hard disk, a compact disc read-only memory (CD-ROM), a magneto-optical disk (MO), a digital versatile disc (DVD), a DVD-ROM, a DVD-RAM, a Blu-ray (registered trade mark) disc (BD), and a semiconductor memory.

The computer program is not limitedly recorded on the recording medium and can alternatively be transmitted via a network or the like represented by an electric communication line, a wireless or wired communication line, or the Internet.

INDUSTRIAL APPLICABILITY

The present disclosure is applicable to a translation device or a translation method.

REFERENCE MARKS IN THE DRAWINGS 1 translation system
10 translation device
11 CPU
12 ROM
13 RAM
14 input I/F
15 output I/F
16 communication I/F
17 storage
18 input operation unit
19 display (display unit)
30 microphone
40 speaker unit
50 voice recognition server
60 translation server
70 voice synthesis server
101 voice acquisition unit
102 original acquisition unit (first language acquisition unit)
103 original transmitter
104 translation acquisition unit (second language acquisition unit)
105 translation transmitter
106 retranslation acquisition unit (first language acquisition unit)
107 polyseme processor
108 retranslation corrector
109 translation corrector
110 original output unit
111 retranslation output unit (first language output unit)
112 translation output unit (second language output unit)
113 voice output unit
20 translation device
201 voice acquisition unit
202 original acquisition unit (first language acquisition unit)
203 original transmitter
204 translation acquisition unit
205 translation transmitter
207 polyseme processor
208 original corrector
209 original output unit
210 translation output unit
212 voice output unit

The invention claimed is:

1. A translation device configured to translate from a first language into a second language, the translation device comprising:
   a first language acquisition unit configured to acquire a sentence in the first language;
   a polyseme processor configured to determine whether or not a word in the second language for a word in the first language included in the sentence is a polyseme, and acquire a plurality of candidate meanings for the word in the second language when the word in the second language is determined as a polyseme;
   a first language output unit configured to output the plurality of candidate meanings;
   a display;
   a second language acquisition unit configured to acquire a translation sentence generated by translation of the sentence into the second language; and
   a second language output unit configured to cause the display to present the translation sentence,
   wherein the first language output unit causes the display to display the plurality of candidate meanings in a selectable manner, and
   wherein when one of the candidate meanings is selected, the second language output unit outputs an element having a meaning corresponding to the one of the candidate meanings.

2. The translation device according to claim 1, wherein each of the candidate meanings includes at least one of a character string in the first language and an image.

3. The translation device according to claim 1, wherein the element includes at least one of text in the second language and an image.

4. The translation device according to claim 1, further comprising a second language acquisition unit configured to acquire a translation sentence generated by translation of an original sentence from the first language into the second language,
   wherein the first language acquisition unit acquires, as the sentence, a retranslation sentence generated by retranslation of the translation sentence into the first language.

5. The translation device according to claim 4, further comprising a display, wherein the first language output unit causes the display to simultaneously display the original sentence and the retranslation sentence.

6. The translation device according to claim 1, further comprising a storage configured to store data including the word in the second language and the plurality of candidate meanings,
   wherein the polyseme processor determines whether or not the word in the second language is the polyseme in accordance with the data.

7. The translation device according to claim 1, wherein the plurality of candidate meanings includes representative data and synonymous data corresponding to the representative data.

8. The translation device according to claim 1, wherein the first language output unit outputs a corrected sentence generated by replacement of the word in the first language with a plurality of text pieces in the first language as the plurality of candidate meanings.

9. The translation device according to claim 1, wherein the first language output unit outputs the sentence along with a plurality of images indicating the plurality of candidate meanings.

10. A translation device configured to translate from a first language into a second language and retranslate from the second language into the first language, by means of a translation server, the translation device comprising:
   a storage configured to store a word in the first language, a univocal in the first language for the word in the first language, a replaced translation word in the second language for the univocal, and a translation word in the second language for the word in the first language;
   a first language acquisition unit configured to acquire a sentence in the first language;
   a polyseme processor configured to determine whether or not the translation word for the word in the first language included in the sentence is a polyseme, and replace the word in the first language with the univocal to generate a replaced sentence in the first language when the translation word is determined as a polyseme;
   a communication unit configured to transmit the replaced sentence to the translation server, and receive, from the translation server, a replaced translation sentence in the second language generated by translation of the replaced sentence into the second language and including the replaced translation word, and a replaced retranslation sentence in the first language generated by retranslation of the replaced translation sentence into the first language and including the univocal;
   a first language output unit configured to output a retranslation sentence in the first language generated by replacement of the univocal included in the replaced retranslation sentence with the word in the first language; and
   a second language output unit configured to output a translation sentence in the second language generated by replacement of the replaced translation word included in the replaced translation sentence with the translation word.

11. A translation method of translating from a first language into a second language by mean of a computer, the translation method comprising:
   acquiring, from a first language acquisition unit, a sentence in the first language;
   determining whether or not a word in the second language for a word in the first language included in the sentence is a polyseme;
   acquiring, from a storage, a plurality of candidate meanings for the word in the second language when the word in the second language is determined as a polyseme; and
   outputting, by a first language output unit, the plurality of candidate meanings,
   acquiring, from a second language acquisition unit, a translation sentence generated by translation of the sentence into the second language; and
   displaying, utilizing a second language output unit, the translation sentence on a display,
   wherein the first language output unit causes the display to display the plurality of candidate meanings in a selectable manner, and
   wherein when one of the candidate meanings is selected, the second language output unit outputs an element having a meaning corresponding to the one of the candidate meanings.

* * * * *